May 17, 1949.   A. B. WHITE   2,470,668
WELDING SYSTEM
Filed May 7, 1946   4 Sheets-Sheet 1

WITNESSES:
E. A. McCloskey.
G. V. Giolma

INVENTOR
Alfred B. White.
BY
G. M. Crawford
ATTORNEY

May 17, 1949.　　　　A. B. WHITE　　　　2,470,668
WELDING SYSTEM

Filed May 7, 1946　　　　　　　　　　　　4 Sheets-Sheet 3

WITNESSES:
E. A. M'Closkey.
F. V. Giolma

INVENTOR
Alfred B. White.
BY G. M. Crawford
ATTORNEY

May 17, 1949. A. B. WHITE 2,470,668
WELDING SYSTEM

Filed May 7, 1946 4 Sheets-Sheet 4

WITNESSES:
E. A. M'Closkey.
F. V. Giolma

INVENTOR
Alfred B. White.
BY
G. M. Crawford
ATTORNEY

Patented May 17, 1949

2,470,668

UNITED STATES PATENT OFFICE 2,470,668

WELDING SYSTEM

Alfred B. White, Murrysville, Pa., assignor to Westinghouse Electric Corporation, East Pittsburgh, Pa., a corporation of Pennsylvania Application May 7, 1946, Serial No. 667,762

11 Claims. (Cl. 315—271)

My invention relates, generally, to welding systems, and it has reference in particular to stabilized arc welding systems.

Generally stated, it is an object of my invention to provide an improved arc welding system which is simple and inexpensive to manufacture, and is reliable and efficient in operation.

More specifically, it is an object of my invention to provide for using a damped stabilizing circuit in combination with an arc welding system having a high-frequency generator for producing arc stabilizing impulses.

It is an important object of my invention to provide for prolonging the duration of the periods of ionization produced by high-frequency impulses applied to a relatively low-frequency alternating-current arc circuit, so that the arc current from a relatively low-frequency source can attain arc sustaining values during the periods of ionization.

Yet another object of my invention is to provide for damping the discharge of an auxiliary stabilizing condenser in an arc welding system, without appreciably damping the charging current thereof.

Still another object of my invention is to provide for maintaining the arc path in an arc welding circuit ionized at one polarity for sufficient time, upon reversal of the source current as it changes to said polarity from the opposite polarity of the previous half cycle, for the arc current to build up to an arc sustaining value.

Another important object of my invention is to provide for preventing reversals of an arc stabilizing current during an attempt to strike an arc during a half cycle of the arc current.

Yet another important object of my invention is to provide for improving the stabilization of the arc in an arc welding system using a bare tungsten electrode.

It is also an important object of my invention to provide for using successive half cycles of welding current particularly when arc welding in a helium or argon atmosphere with a tungsten electrode.

Other objects will in part be obvious and will in part be described hereinafter.

In accordance with one embodiment of my invention, an improved arc stabilizing circuit including a condenser and a damping resistor is connected in shunt relation in an arc welding circuit which is provided with a high-frequency arc stabilizing source, so as to provide an energy storage circuit having a time constant which is sufficiently large to permit a non-oscillatory discharge of the condenser in response to a high-frequency impulse so that the welding current from the source builds up to an arc sustaining value before the ionization of the arc gap produced by the high-frequency impulse dies down.

For a more complete understanding of the nature and scope of my invention, reference may be made to the following detailed description which may be studied in connection with the accompanying drawings, in which.

Figure 9A:
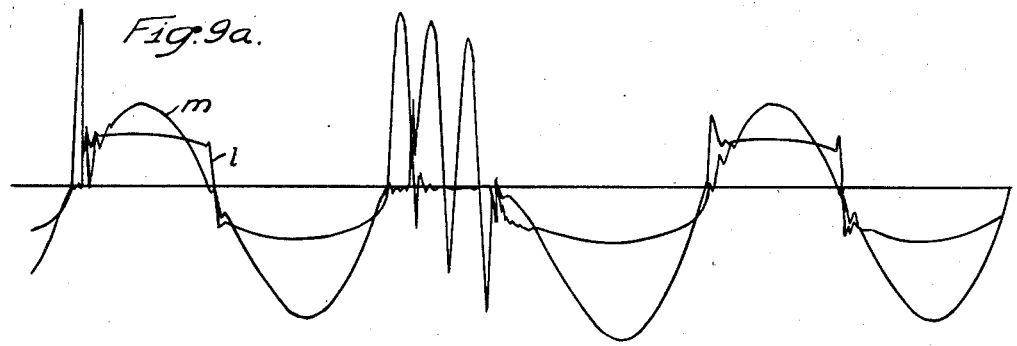
Figure 9B:
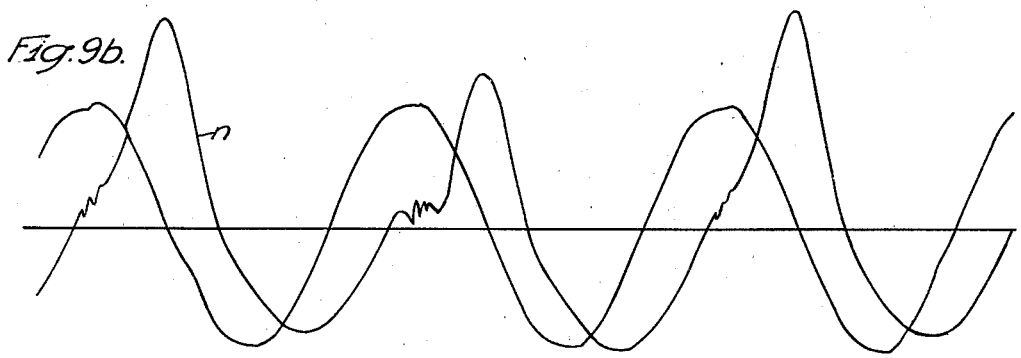
Figure 10A:
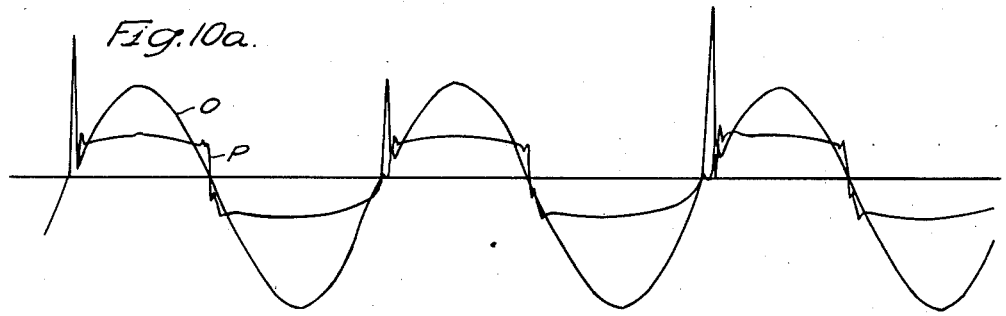
Figure 10B:
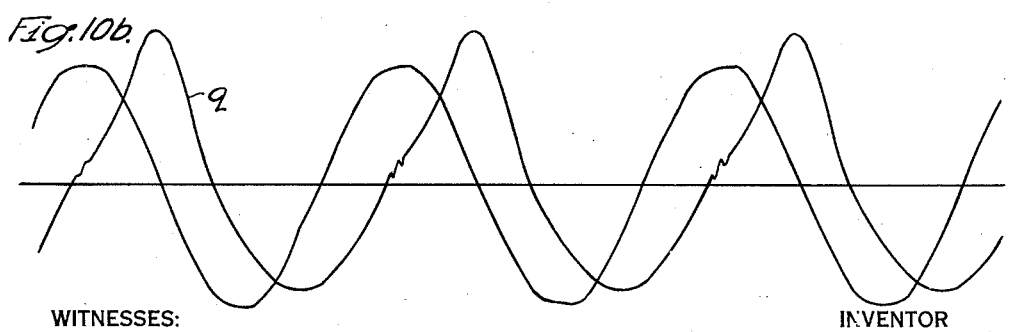

Figs. 9a and 9b illustrate curves showing the voltage and current conditions in the arc circuit and in the supply circuit of an arc welding system under the same conditions when the arc circuit is provided with a stabilizing condenser and a 1 ohm resistor; and Figs. 10a and 10b illustrate curves showing the current and voltage conditions in the arc circuit and in the supply circuit of an arc welding system under the same conditions and utilizing an arc stabilizing condenser and a 5 ohm damping resistor.

Figure 1:
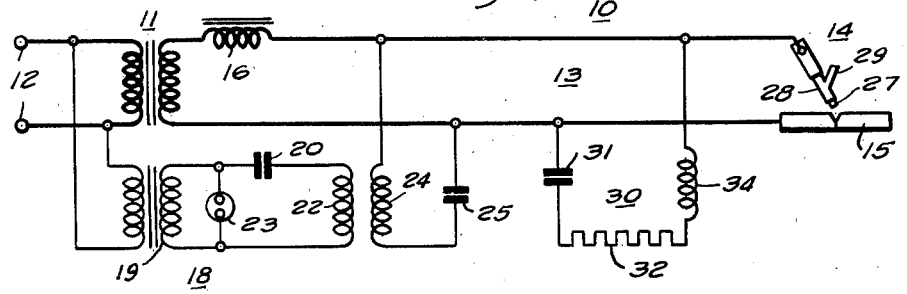
Figure 1 is a diagrammatic view of an arc welding system embodying the invention in one of its forms.

Referring to Fig. 1, the reference numeral 10 may denote, generally, an arc welding system wherein a welding transformer 11 is utilized to supply current from a relatively low-frequency alternating-current source 12 to an arc circuit 13 including an electrode device 14 and work 15 upon which an arc welding operation is to be performed. A reactance device 16 may be connected in the arc circuit to provide for limiting fluctuations of the arc current.

In order to assist in establishing or reestablishing an arc between the electrode device 14 and work 15 each time the welding current passes through the zero value between half cycles, means such as the high-frequency generator 18 may be utilized. The generator 18 may be of any suitable type comprising, for example, a step-up transformer 19 having a condenser 20 and inductive device 22 connected to the secondary winding in shunt circuit relation with an arc gap 23 for producing oscillating current impulses. The generator 18 may be coupled to the arc welding circuit by means of an inductance device 24 and a condenser 25, which may, for example, be connected in shunt circuit relation with the arc circuit.

In order to provide for improving the arc stabilizing effects of the high-frequency generator 18 under any conditions, and particularly when the electrode device 14 comprises a bare tungsten electrode 27 having a conduit 28 associated therewith with an inlet connection 29 for supplying an inert gas to the welding zone, such as, for example, helium or argon, an arc stabilizing circuit 30 may be provided. The arc stabilizing circuit may comprise a condenser 31 and a damping resistor 32 which may be connected in shunt circuit relation with the arc circuit for providing a damped discharge of the electrical energy from the condenser 31 into the arc circuit whenever the high-frequency generator 18 provides a high-frequency impulse for breaking down the arc gap between the electrode 27 and the work 15. An inductance device 34 may be connected in series circuit relation with the condenser 31 and the damping resistor 32 to prevent the stabilizing circuit 30 from short-circuiting the high-frequency generator 18.

In operation the condenser 31 will be charged to a relatively high energy level whenever the welding transformer 11 is open-circuited, either before an arc is struck, or when it is momentarily extinguished, since the open-circuit secondary voltage of the welding transformer rises to a relatively high value. Whenever the high-frequency generator 18 produces a high-frequency impulse which momentarily ionizes the arc gap between the electrode 27 and work 15, the condenser 31 tends to discharge rapidly through the ionized gap. Whenever this is the case, the discharge is oscillatory, and the cathode spot transfer from the work to the electrode on successive half cycles so that only extremely short intervals are available for the arc to establish. By providing a damping resistor 32 it is possible to effect a damped or non-oscillatory discharge of the condenser 31 across the arc gap following a high-frequency impulse, so as to prevent any reversal of the current in the arc gap during discharge of the condenser. This maintains a cathode spot on the work 15 for a sufficient period of time to permit the current from the welding transformer 11 to build up to the necessary arc sustaining value before the discharge from the condenser 31 terminates, thereby maintaining the arc. This result is not always obtained with high-frequency impulses alone, since they are oscillatory and are of short duration. Often under normal conditions and almost always when welding in an inert gaseous atmosphere with a bare metallic electrode such as tungsten high-frequency impulses alone do not maintain a cathode spot on the work sufficiently long for the arc to reestablish, since the cathode spot produced by them transfers to the electrode or negative half cycles of the oscillatory discharge. The use of a bare metal electrode removes the normal source of ions, and the fact that tungsten is a good emitter tends to favor the establishment of a cathode spot on the electrode.

Figure 6:
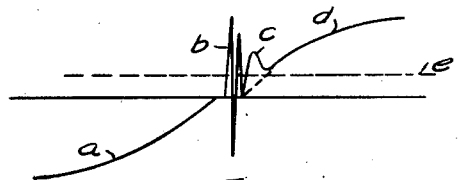
Fig. 6 illustrates curves showing the current in an arc circuit utilizing the invention during the transient period from one half cycle to another.

Referring to Fig 6, the curve $a$ represents the welding current in a negative half cycle as it approaches the zero value. The curve $b$ represents one of the oscillatory high-frequency impulses such as are produced by a generator of a type which is frequently utilized in connection with a relatively low-frequency alternating arc current system in establishing the flow of welding current for succeeding half cycles. When welding under normal conditions, with coated electrodes and a normal surrounding atmosphere, high-frequency impulses of the type designated by the curve $b$ are usually sufficient to maintain the ionization of the arc gap until the current from the source of welding current reverses and reaches a value sufficient to sustain the arc. However, when welding with a bare tungsten electrode such as used in an inert gaseous atmosphere comprising, for example, helium or argon, such high-frequency impulses are found to be quite insufficient to insure re-establishment of the arc during positive half cycles of the welding current. The gaseous atmosphere in conjunction with electrodes of unequal size of particular materials appears to have an asymmetric conducting quality which makes it more difficult to establish the arc on positive half cycles than on negative half cycles.

By providing a damped arc stabilizing circuit of the nature hereinbefore described, a current surge may be provided in conjunction with the oscillatory high-frequency impulse represented by the curve $b$ which is of sufficient duration and of the same polarity during any one half cycle, to permit the current from the source of welding current to build up to an arc sustaining value during this auxiliary discharge, which may be represented by the curve $c$. When the welding current represented by the curve $d$ reaches a value above the minimum necessary to maintain an arc, and which value may be designated by the dotted line $e$, the flow of current during the remainder of the positive half cycle may be insured. Thus, successive half cycles of the welding current may be used in welding, despite the rectifying effects of the inert gaseous atmosphere, unequal electrodes and electrode materials.

Figure 2:
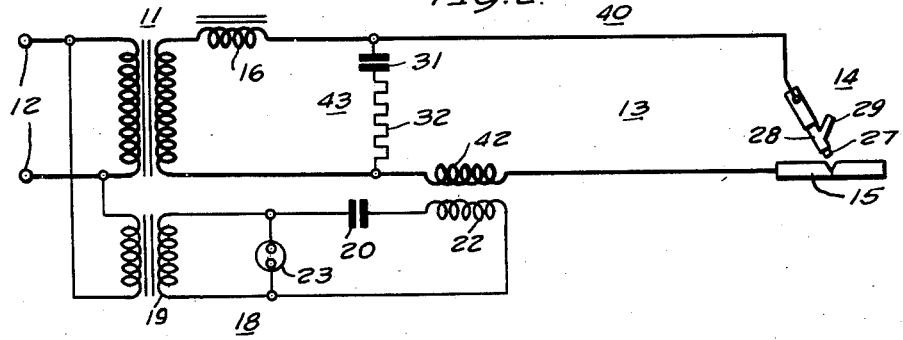
Fig. 2 is a diagrammatic view of an arc welding system embodying the invention in another of its forms.

Referring to Fig. 2, the reference numeral 40 may denote, generally, an arc welding system wherein a welding transformer 11' may as hereinbefore be used to supply alternating current from the source 12 to an arc welding circuit 13 including an electrode device 14 and work 15. A high-frequency generator 18 of any suitable type may be used to supply high-frequency impulses to the welding circuit through a series coupling inductance device 42. An arc stabilizing circuit 43 comprising a condenser 31 and a damping resistor 32 similar to that described in connection with Fig. 1 may be connected intermediate the coupling device 42 and the welding transformer 11 in shunt circuit relation with the welding circuit for improving operation of the welding system.

The operation of the stabilizing circuit is similar to that described hereinbefore in detail in connection with the circuit shown in Fig. 1. The inductance device 34 of Fig. 1 may be omitted in the stabilizing circuit of Fig. 2 since the high-frequency generator 18 is coupled to the arc welding circuit by series coupling device 42 and there is, therefore, no danger of the arc stabilizing circuit short-circuiting the output of the high-frequency generator. In other respects, the system of Fig. 2 is similar to that shown in Fig. 1, and functions in a similar manner.

Figure 3:
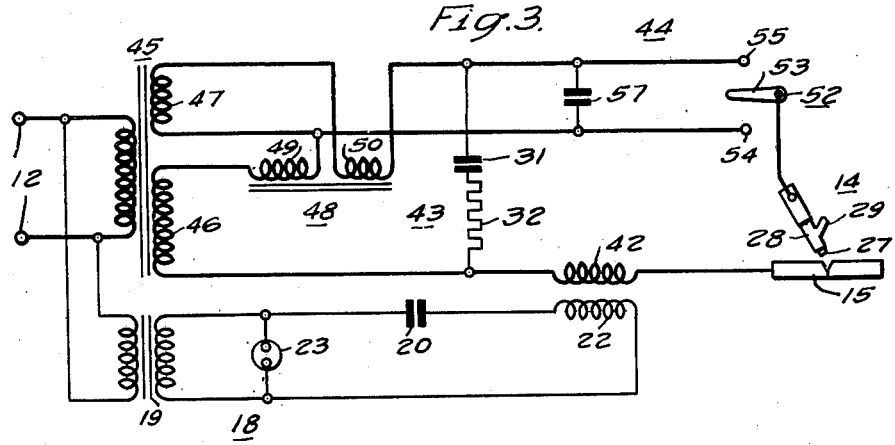
Fig. 3 is a diagrammatic view of a modified form of arc welding system utilizing the invention.

Referring to Fig. 3, the reference numeral 44 may denote, generally, a multiple voltage arc welding system wherein a welding transformer 45 having main and auxiliary secondary windings 46 and 47 may be utilized to supply welding current to an arc welding circuit including an electrode device 14 and work 15 from a source 12.

An inductance device 48 may be provided, having windings 49 and 50 which may be connected between the main and auxiliary transformer windings 46 and 47, and on the remote side of the auxiliary winding 47, respectively.

Switch means 52 may be provided having movable switch arm 53 for engaging stationary contacts 54 and 55 which may be connected intermediate the reactor winding 49 and auxiliary secondary winding 47, and to the side of the reactance winding 50 which is remote from the auxiliary secondary winding 47, so as to provide for applying the voltage of the main winding 46, or the cumulative sum of the voltages of the main and auxiliary windings to the arc welding circuit.

Stabilization of the arc may be effected by connecting a high-frequency generator 18 to the arc welding circuit through series inductance coupling means 42, and providing an arc stabilizing circuit 43 including a condenser 31 and a damping resistor 32. The stabilizing circuit is preferably connected across the high-voltage output of the welding transformer since the effect of the condenser is enhanced by transformer action of the welding source when using the low-voltage high current portion of the welding transformer when switch arm 53 engages the stationary contact 54.

An auxiliary bypass condenser 57 may be connected across the auxiliary secondary winding 47 and its associated reactor winding 50 so as to keep the voltage from the high-frequency source 18 substantially equal on both the high and low ranges. The arc stabilizing circuit 43 functions in substantially the same manner as the circuits 30 and 43 of Figs. 1 and 2.

Figure 4:
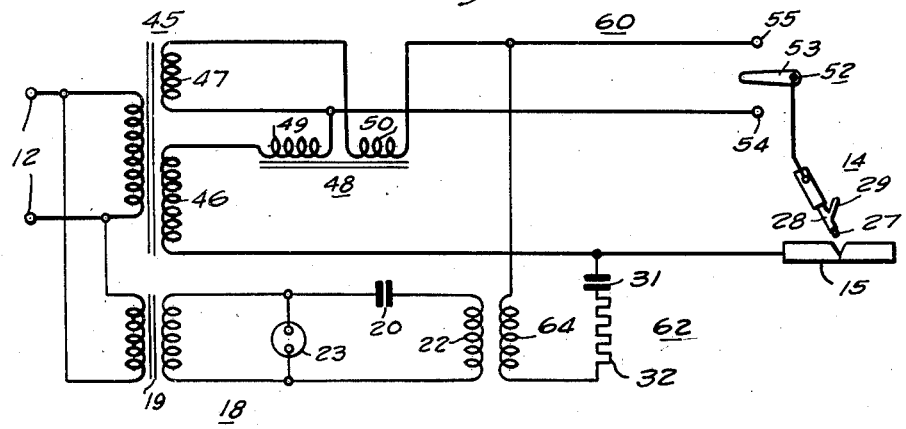
Fig. 4 is a diagrammatic view of an arc welding system embodying the invention in yet another of its forms.

Referring to Fig. 4, the reference numeral 60 may denote, generally, an arc welding circuit wherein a welding transformer 45 having main and auxiliary secondary windings 46 and 47 for utilizing the supplying welding current at different voltages from a source 12 to an arc welding circuit including electrode device 14 and work 15. A reactor having reactance windings 49 and 50 may be utilized to stabilize the arc current in the welding circuit for the different ranges.

A high-frequency generator 18 may be provided for supplying high-frequency impulses to the welding circuit to stabilize the welding current and prevent extinction of the arc as the arc current passes through the zero value. Means such as the stabilizing circuit 62 may be provided for assisting the high-frequency generator 18 to maintain the arc current through the zero value between successive half cycles. The stabilizing circuit 62 may comprise a condenser 31 and a damping resistor 32 such as described in connection with Figs. 1, 2 and 3. In order to reduce the amount of equipment necessary, the condenser 31 and the resistor 32 may be connected in shunt circuit relation with the arc, and in series circuit relation with an inductance coupling device 64 to provide both an arc stabilizing circuit and coupling means for connecting the high-frequency generator 18 to the welding circuit. In operation the arc stabilizing circuit 62 performs in substantially the same manner as the circuit 30 of the system shown in Fig. 1.

Figure 5:
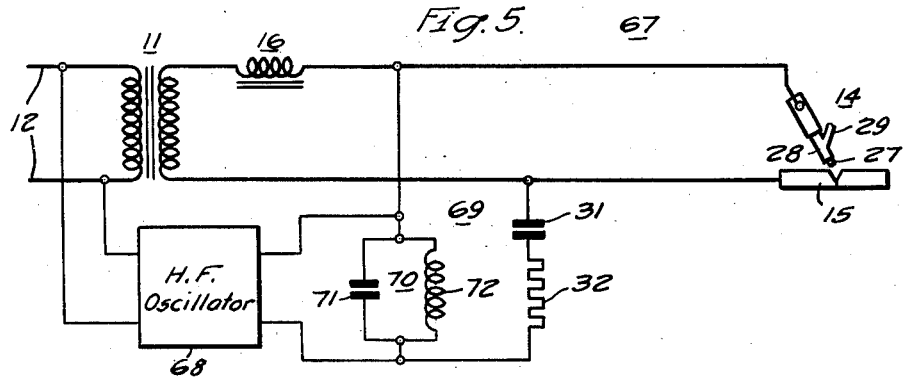
Fig. 5 is a diagrammatic view of yet another form of arc welding system embodying the invention.

Referring to Fig. 5, the reference numeral 67 may denote, generally, an arc welding system wherein a welding transformer 11 and a reactance device 16 may be used to supply welding current from the source 12 to an arc welding circuit including an electrode device 14 and work 15. A high-frequency generator or oscillator 68 of the tube type may be provided for supplying high-frequency impulses to the welding circuit for the purpose of stabilizing the arc.

In order to connect the generator 68 to the arc welding circuit, a stabilizing and coupling circuit 69 may be provided. The circuit 69 may comprise a tank circuit 70 including a shunt resonant circuit of a condenser 71 and an inductance device 72 for tuning the oscillator output, connected in shunt circuit relation with the generator 68 and in series circuit relation with a stabilizing condenser 31 and a damping resistor 32. The condenser 31 will be charged from the arc welding circuit when the welding circuit is open-circuited, and will discharge when impulses from the high-frequency generator 68 ionize the arc gap in substantially the same manner as described hereinbefore in connection with the arc welding systems of Figs. 1 through 4.

Figure 7A:
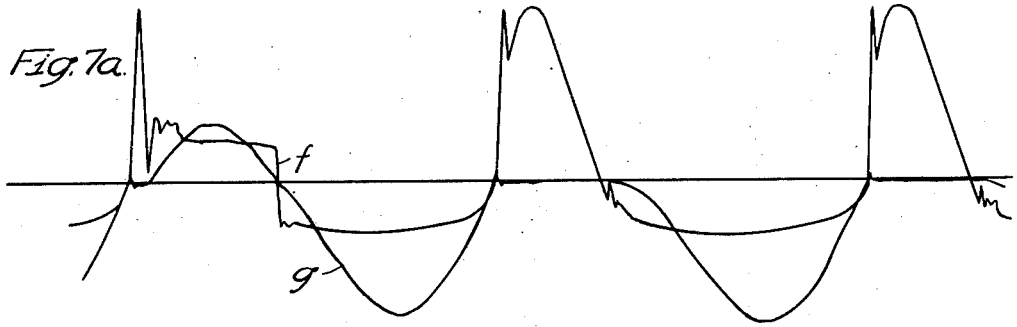
Figs. 7a and 7b illustrate curves showing the current and voltage relations in the arc circuit and in the supply circuit of an arc welding system using a bare tungsten electrode in an inert gaseous atmosphere without either an arc stabilizing condenser or damping resistor.
Figure 7B:
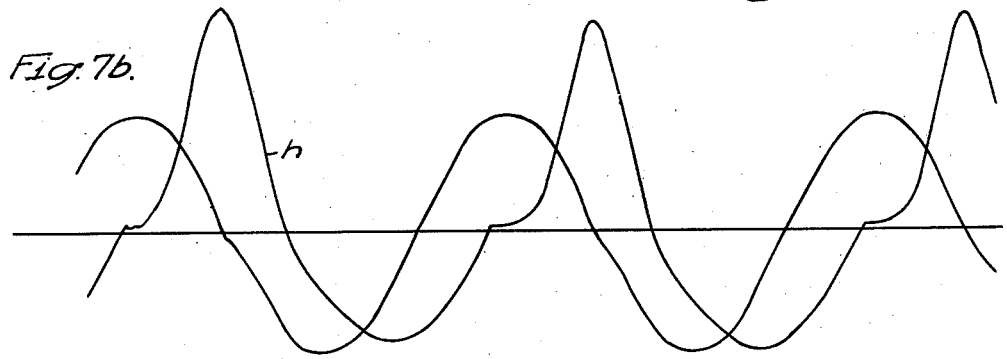

Referring to Figs. 7a and 7b, the curve $f$ represents the welding current while the curve $g$ represents the voltage of the arc welding circuit in an arc welding system using a bare tungsten electrode in an argon atmosphere with a 60-cycle source of welding current in conjunction with a high-frequency generator of the usual type which supplies peaked impulses when the welding current reaches the zero value in an effort to re-establish the flow of welding current on the following half cycle. It will be seen from the curve $f$ that while the arc was established on the first and second half cycles, during the two succeeding positive half cycles the arc current remained at the zero value, showing that the high-frequency impulses were insufficient to properly stabilize the arc, partially due to the lack of the usual source of ions such as the coating of the electrode, partially due to the fact that the tungsten electrode readily emits ions, and partially due to the wide variance in size of the electrode and work. As shown in Fig. 7b, the primary current represented by the curve $h$ had an objectionably high peak, probably due to saturation, and the wave form was higly distorted, thus producing undesirable transients in the supply lines to the welding system.

Figure 8A:
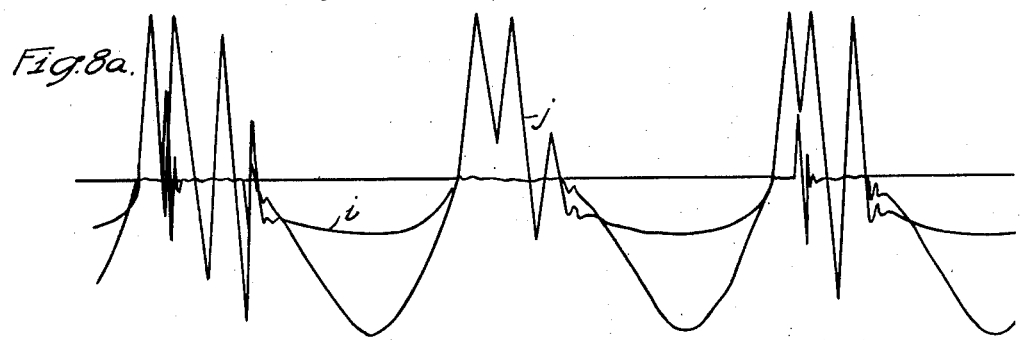
Figs. 8a and 8b illustrate voltage and current curves in the arc welding circuit and in the supply circuit of an arc welding system under the same conditions and utilizing an arc stabilizing condenser without a damping resistor.
Figure 8B:
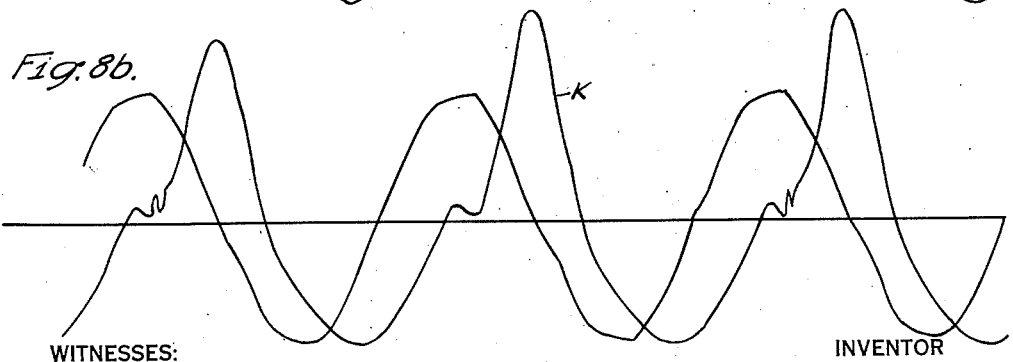

Referring to Fig. 8a it will be seen that even when an arc stabilizing condenser of 20 microfarads is used in shunt circuit relation with the arc, the discharge current therefrom through the arc gap is oscillatory, and the oscillations are not of sufficient duration to permit re-establishment of the arc during the positive half cycles when using a tungsten electrode with an inert gaseous atmosphere. The current curve $i$ clearly shows that during the three positive half cycles the arc remained extinguished. The voltage curve $j$ shows that the voltage of the arc circuit fluctuated highly due to the oscillatory discharge from the 20 microfarad condenser. From Fig. 8b it will be seen that the primary current represented by the curve k also has substantially high peaked values during the positive half cycles, and the wave form is distorted showing the presence of transients.

Referring to Fig. 9a the curves l and m represent the arc current and voltage in an arc welding system using a 20 microfarad stabilizing condenser and a 1 ohm resistor in shunt with the arc. While this arrangement provided for establishment of the arc during a number of positive half cycles, the results were not consistent, thus illustrating that the discharge of the stabilizing condenser was still not damped sufficiently to insure definite re-establishment of the arc on positive half cycles. The current curve n in Fig. 9b still shows that the primary current is quite distorted, and that it reaches relatively high peak values during the positive half cycles.

In Fig. 10a the curves o and p represent the voltage and current in the arc circuit of an arc welding system using a bare tungsten electrode in an argon atmosphere, and having an arc stabilizing circuit with a 20 microfarad condenser and a 5 ohm resistor connected in series circuit relation and in shunt with the arc. The consistent re-establishment of the arc during both positive and negative half cycles clearly illustrates the benefits of the damped discharge from the arc stabilizing condenser. The current curve q of Fig. 10b shows that the distortion of the line current is reduced to a minimum. The peak values of the primary current during the positive half cycles are also clearly reduced so that the primary current approaches more nearly a uniform sine wave, thus distinctly providing a minimum of disturbance in the supply system.

From the above description and the accompanying drawings, it will be apparent that I have provided in a simple and effective manner for improving the performance of alternating-current arc welding systems under all operating conditions, although the advantages may be more particularly noticed when welding with a bare tungsten electrode in inert gaseous atmospheres, such, for example, as argon and helium. It has been found that highly satisfactory results may be obtained under a wide range of operating conditions using a stabilizing condenser of from about 10 to 50 microfarads, and a damping resistor of from about 10 to 2 ohms. These values depend largely on the capacitance and inductance in the discharge circuit of the condenser which includes the inductance of the welding leads as well as interposed coils or other inductance devices. In order to obtain the maximum results from the arc stabilizing circuit the damping resistor should have a sufficient value to effect overdamping the arc discharge current without appreciably damping its charging current. A single non-oscillatory discharge pulse of relatively long duration may thus be obtained from the stabilizing condenser which permits re-establishment of the arc. This result is possible since the critical resistance in the low inductance discharge circuit which includes the arc is normally substantially greater than that of the charging circuit, which includes the low resistance, high inductance secondary winding and reactor of the transformer.

Since certain changes may be made in the above described construction and different embodiments of the invention may be made without departing from the spirit or scope thereof, it is intended that all matter contained in the above description and shown in the accompanying drawings shall be considered as illustrative and not in a limiting sense.

I claim as my invention:

1. For use with an arc welding circuit including a reactance device and having a high-frequency arc stabilizing source connected thereto, an arc stabilizing circuit including a condenser and a resistor connected in a series circuit path in shunt relation with the arc intermediate the reactance device and the arc.

2. The combination with an alternating current arc welding circuit having a reactance device and an arc gap therein and provided with a high-frequency generator for ionizing the gap, of an arc stabilizing circuit comprising a series connection of a condenser and a resistor of sufficient value to produce substantially damped discharge of the condenser without appreciably damping the charging current thereof connected in shunt circuit relation with the arc intermediate the reactance device and the arc.

3. In an inert gaseous atmosphere arc welding system in combination, an arc welding circuit disposed to be energized from a relatively low-frequency source of electrical energy for maintaining an arc in an inert gaseous atmosphere, a relatively high-frequency generator connected to supply high-frequency impulses for ionizing the arc gap, and an arc stabilizing circuit connected in shunt relation with the arc gap including a condenser and a damping resistor of sufficient value to prevent reversal of the condenser discharge current during an attempt to strike an arc following a value of arc current zero.

4. The combination with a welding transformer having a secondary winding for supplying welding current to an arc welding circuit through a reactance device, of a high-frequency generator, and means including an arc stabilizing circuit including a condenser and a damping resistor connecting the high-frequency generator to the arc welding circuit intermediate the reactance device and the arc welding circuit.

5. An arc welding system comprising, a welding transformer having a primary winding for connection to a relatively low voltage source of alternating current and a secondary winding for supplying an arc circuit including a tungsten electrode in an inert gaseous atmosphere, a high-frequency generator, reactance means connecting the generator in series relation with the arc circuit, and an arc stabilizing circuit including a condenser and an oscillation damping resistor connected in shunt relation with the secondary winding between the reactance means and the secondary winding.

6. An arc welding system comprising, a welding transformer having a primary winding for connection to a relatively low-frequency source of alternating current and a secondary winding having a pair of sections for supplying welding current to an arc welding circuit at different potentials, reactance means having one section connected serially between the secondary winding sections and another section connected in series circuit relation with one of the secondary winding sections on a side remote from the other secondary winding section, a high-frequency generator serially coupled to the arc circuit on the side of the other secondary winding remote from said one secondary winding, an arc stabilizing circuit including a condenser, and an oscillation damping resistor connected between the remote sides of the secondary windings on the arc welding circuit side of the reactance means, an additional condenser connected across said other secondary winding section and its associated reactance means, and means connecting the arc welding circuit across one or both secondary winding sections and their associated reactance means.

7. In combination, an arc welding transformer having a primary winding and a secondary winding comprising a main section and an auxiliary section, reactance means comprising one section connected between the main and auxiliary winding sections and a second section connected to the auxiliary section on a side remote from the main section, an arc stabilizing circuit comprising a series path of a condenser and a resistor connected in shunt relation with the secondary sections and their reactance means, and an auxiliary condenser connected in shunt relation with the auxiliary winding section and its associated reactance means.

8. For use with an arc circuit disposed to be energized from welding transformer having a secondary winding connected to a high-frequency generator, an arc stabilizing circuit comprising, a series circuit of a condenser of from 5 to 50 microfarads and a resistor of from 10 to 2 ohms connected in shunt relation with the secondary winding.

9. For use with an alternating current arc circuit having a reactance device in circuit therewith, an arc stabilizing circuit comprising a series circuit of a 20 microfarad condenser and a 5 ohm resistor connected in shunt circuit relation with the arc intermediate the reactance device and the arc.

10. For use with an alternating-current transformer for supplying welding current from a 60-cycle source to an arc circuit and having a high-frequency generator coupled to the arc circuit in series circuit relation therewith, an arc stabilizing circuit comprising a 2 to 10 ohm resistor and a 50 to 10 microfarad condenser connected in series circuit in shunt relation with the arc intermediate the high-frequency coupling means and the alternating current transformer.

11. For use with an arc welding system including an arc circuit disposed to be energized from a source of alternating current through a reactance device connected in circuit relation therewith, a high frequency generator, reactance coupling means coupling the generator in series circuit relation in the arc circuit, and an arc stabilizing circuit including a capacitor and a resistor connected in shunt circuit relation with the arc circuit, said stabilizing circuit being connected intermediate the reactance device and the arc circuit, and also intermediate the reactance coupling means and the source.

ALFRED B. WHITE.

REFERENCES CITED

The following references are of record in the file of this patent:

UNITED STATES PATENTS

| Number | Name | Date |
|---|---|---|
| 1,938,618 | Bethenod | Dec. 12, 1933 |
| 1,973,122 | Stoddard | Sept. 11, 1934 |
| 2,085,242 | Weaver | June 29, 1937 |
| 2,399,415 | White | Apr. 30, 1946 |